(12) United States Patent
McFarthing

(10) Patent No.: US 12,143,252 B2
(45) Date of Patent: Nov. 12, 2024

(54) HIGHER BIT RATE MODULATION FORMAT FOR POLAR TRANSMITTER

(71) Applicant: QUALCOMM Incorporated, San Diego, CA (US)

(72) Inventor: Anthony McFarthing, Ely (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/822,966

(22) Filed: Aug. 29, 2022

(65) Prior Publication Data

US 2024/0073071 A1    Feb. 29, 2024

(51) Int. Cl.
*H04L 27/20* (2006.01)
*H04L 27/34* (2006.01)
*H04L 27/36* (2006.01)

(52) U.S. Cl.
CPC ...... *H04L 27/2067* (2013.01); *H04L 27/3444* (2013.01); *H04L 27/36* (2013.01)

(58) Field of Classification Search
CPC ..... H04L 27/20; H04L 27/2067; H04L 27/34; H04L 27/3427; H04L 27/3433; H04L 27/3438; H04L 27/3444; H04L 27/36; H04L 27/362
USPC ................ 375/260, 261, 279–281, 298, 308; 332/103
See application file for complete search history.

(56) References Cited

U.S. PATENT DOCUMENTS

| | | | |
|---|---|---|---|
| 8,621,315 B2 * | 12/2013 | Trachewsky | H04L 1/005 714/790 |
| 8,848,830 B2 * | 9/2014 | Clevorn | H04L 27/3411 332/183 |
| 2005/0025256 A1 | 2/2005 | Van De Beek et al. | |
| 2005/0232374 A1 * | 10/2005 | Mantyla | H04L 27/362 375/308 |
| 2008/0181326 A1 | 7/2008 | Krueger et al. | |
| 2009/0185545 A1 | 7/2009 | Tarighat-Mehrabani et al. | |
| 2010/0232348 A1 * | 9/2010 | Wu | H04L 1/0003 370/329 |
| 2017/0201329 A1 * | 7/2017 | Kan | H04L 27/0008 |
| 2021/0385812 A1 | 12/2021 | Fakoorian et al. | |

OTHER PUBLICATIONS

International Search Report and Written Opinion—PCT/US2023/072073—ISA/EPO—Dec. 8, 2023.

* cited by examiner

*Primary Examiner* — Young T. Tse
(74) *Attorney, Agent, or Firm* — MG-IP Law, P.C.

(57) ABSTRACT

Disclosed are techniques for wireless communication. In an aspect, a wireless communications device transmits a first set of symbols of a plurality of symbols of a data stream using a first set of constellation points of a pi/N-based modulation scheme, and transmits a second set of symbols of the plurality of symbols using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

38 Claims, 13 Drawing Sheets

For example if, Symbol Rate, SR = 1MBaud/s

Baseband BW6dB = BW *SR/2 = 1.0*SR/2 = 500kHz

RF BW6dB = 1.0MHz

The square root of this response is placed in the TX and in the RX so overall the response from TX to RX is as shown and is referred to as Full Raised Cosine (FRC). The filters in the TX and RX are Square Root Raised Cosines (a.k.a. Root Raised Cosine (RRC)).

Roll-Off (RO) = alpha*100

HIGHER BIT RATE MODULATION FORMAT FOR POLAR TRANSMITTER

BACKGROUND OF THE DISCLOSURE

1. Field of the Disclosure

Aspects of the disclosure relate generally to wireless communication.

2. Description of the Related Art

Bluetooth is a type of wireless technology usually used for exchanging data between devices over short distances, for example, a personal area network (PAN). Although initial Bluetooth applications were used for communicating audio data (e.g., a wireless headset) or pointing device movement/selection data (e.g., a wireless mouse), recent Bluetooth applications are utilized for communicating entire data files and other discrete data that requires error-free transmission so as to avoid data corruption.

Bluetooth uses different variations of phase-shift keying (PSK) modulation, a type of QAM, such as n/4-differential quadrature PSK (n/4-DQPSK), also denoted "PI/4DQPSK," and octal DPSK, also denoted "8-DPSK," depending on the application. Different modulation formats are well suited for transmitters employing polar modulation. A polar modulated transmitter has become a technique that reduces power dissipation and is therefore a favored architecture for low power transceivers. Modulation formats with zero crossings tend to be simple formats with a low channel data rate capability, such as offset QPSK or PI/4DQPSK, which do not have zero crossings. Bluetooth Enhanced Data Rate 3 (EDR3) octal PSK (also denoted "8-PSK," "PSK8," or the like) does have zero crossing and distortion is usually employed to make it suitable for a polar transmitter, but this uses distortion, which is not ideal.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a wireless communications device includes transmitting a first set of symbols of a plurality of symbols of a data stream, wherein the first set of symbols is modulated using a first set of constellation points of a pi/N-based modulation scheme; and transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a method of wireless communication performed by a wireless communications device includes receiving a first set of symbols of a plurality of symbols of a data stream, wherein the first set of symbols is modulated using a first set of constellation points of a pi/N-based modulation scheme; and receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a wireless communications device includes a memory; at least one transceiver; and at least one processor communicatively coupled to the memory and the at least one transceiver, the at least one processor configured to: transmit, via the at least one transceiver, a first set of symbols of a plurality of symbols of a data stream, wherein the first set of symbols is modulated using a first set of constellation points of a pi/N-based modulation scheme; and transmit, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a wireless communications device includes a memory; at least one transceiver; and at least one processor communicatively coupled to the memory and the at least one transceiver, the at least one processor configured to: receive, via the at least one transceiver, a first set of symbols of a plurality of symbols of a data stream, wherein the first set of symbols is modulated using a first set of constellation points of a pi/N-based modulation scheme; and receive, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a wireless communications device includes means for transmitting a first set of symbols of a plurality of symbols of a data stream, wherein the first set of symbols is modulated using a first set of constellation points of a pi/N-based modulation scheme; and means for transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a wireless communications device includes means for receiving a first set of symbols of a plurality of symbols of a data stream, wherein the first set of symbols is modulated using a first set of constellation points of a pi/N-based modulation scheme; and means for receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a non-transitory computer-readable medium stores computer-executable instructions that, when executed by a wireless communications device, cause the wireless communications device to: transmit a first set of symbols of a plurality of symbols of a data stream, wherein the first set of symbols is modulated using a first set of constellation points of a pi/N-based modulation scheme; and transmit a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

In an aspect, a non-transitory computer-readable medium stores computer-executable instructions that, when executed by a wireless communications device, cause the wireless communications device to: receive a first set of symbols of a plurality of symbols of a data stream, wherein the first set of symbols is modulated using a first set of constellation points of a pi/N-based modulation scheme; and receive a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
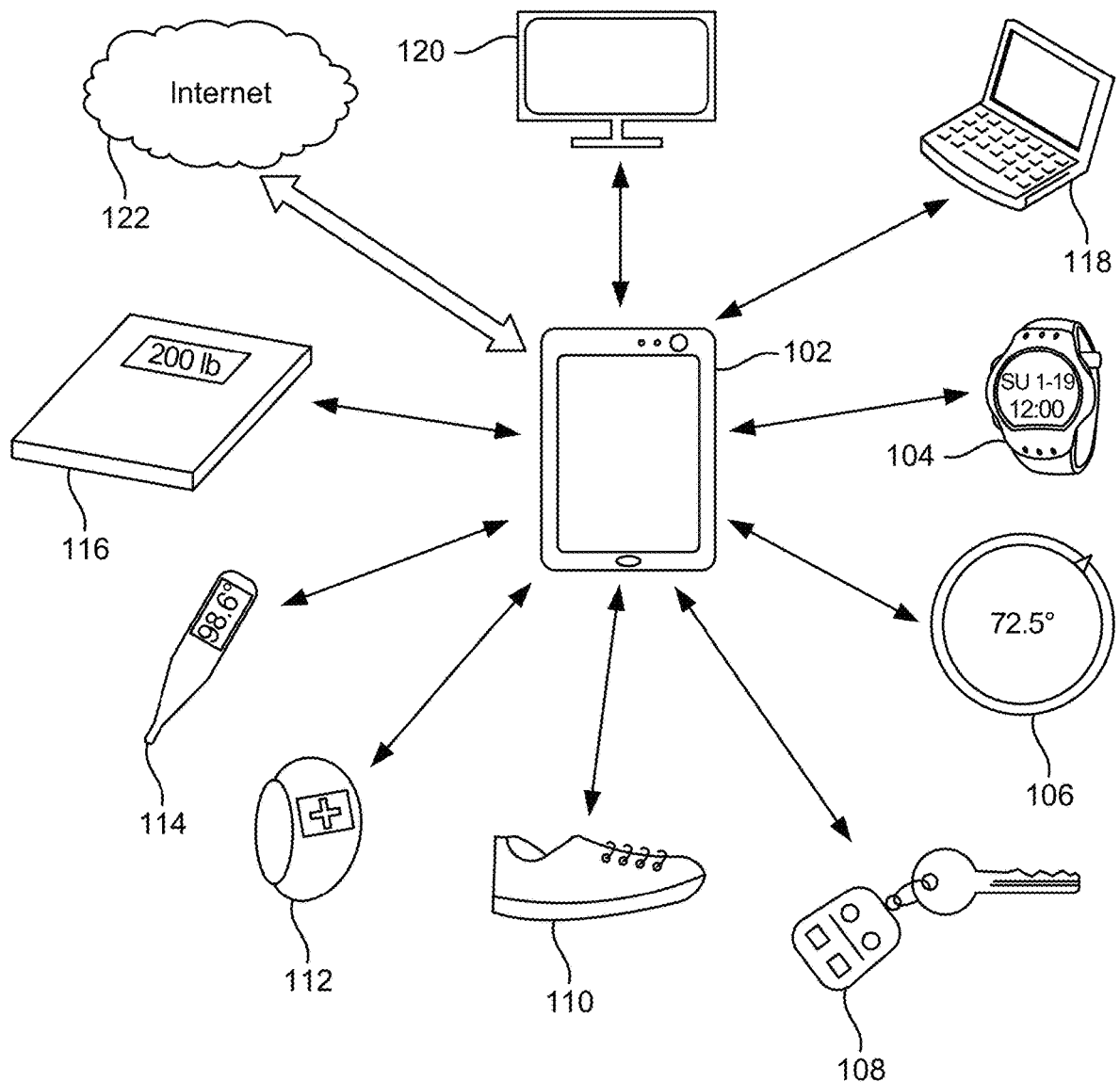
FIG. 1 illustrates various consumer devices in which aspects of the disclosure may be incorporated.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "wireless device" refers to any type of device that includes Bluetooth capability, whether Bluetooth Classic, Bluetooth Smart, Bluetooth Smart Ready, or other. In general, a wireless device may be any wireless communication device, such as a mobile phone, router, tablet computer, laptop computer, tracking device, wearable (e.g., smartwatch, wireless headset, earbuds, glasses, augmented reality (AR)/virtual reality (VR) headset, etc.), in-vehicle communication device, portable hard drive, computer gaming device, pointing device (e.g., a mouse, keyboard, pen, trackball, joystick, etc.), Internet of Things (IoT) device (e.g., home appliance, television, smart speaker, etc.), etc., capable of communicating with other wireless devices over a Bluetooth link. In addition to being Bluetooth capable, a wireless device may be able to communicate over other types of wireless networks, such as a wireless local area network (WLAN) (e.g., based on Institute of Electrical and Electronics Engineers (IEEE) 802.11, etc.) or a cellular network (e.g., Long-Term Evolution (LTE), 5G New Radio, etc.), to name a few examples. Such a wireless device may be referred to interchangeably as a "user equipment" (UE), an "access terminal" (AT), a "client device," a "subscriber device," a "subscriber terminal," a "subscriber station," a "user terminal" (UT), a "mobile device," a "mobile terminal," a "mobile station," or variations thereof.

A wireless device may be configured as a controller or a remote (or "peripheral"). Often the controller is a smartphone, tablet, or personal computer. A controller may set up a wireless network with multiple remotes, where connections are established between the controller and each remote. A wireless device may also be configured as a server or a client. In practice, the server may be thought of as having data of interest, whereas a client connects with the server to request the data and perhaps modify the state of the server. Usually, the controller is the client and a remote is the server.

For example, a Bluetooth home thermostat may store temperature values over some period of time and perform as a server and remote to a smartphone when the smartphone is brought in proximity to the home thermostat. The home thermostat may advertise itself so that when the smartphone is in range a connection is established with the smartphone as the controller and the home thermostat as the remote. In this example, the smartphone performs as the client, requesting the stored temperature values from the home thermostat. Based upon an application running on the smartphone, the smartphone may change the state of the thermostat whereby the home thermostat's temperature setting is raised or lowered depending upon the stored temperature readings and other information that the smartphone may access from the home thermostat or perhaps from cloud-based databases.

Bluetooth technology has found applications in many devices in common use around the home, office, factory, etc. For example, FIG. 1 illustrates a wireless network in which a smartphone 102 may be a controller and client to multiple Bluetooth capable devices: a wristwatch 104 with a sensor to measure pulse rate; a home thermostat 106; a key fob 108 with stored car seat settings and other car preferences; an athletic shoe 110 with a pedometer; a wrist band 112 with a sensor to measure blood pressure and heart rate; a personal thermometer 114; a weight scale 116; a laptop 118; and a television 120. The smartphone 102 may be connected to the Internet 122 so that various databases may be accessed to store readings or to adjust the state of some of the Bluetooth devices, or perhaps to alert a health care professional or emergency service personnel if a reading from a Bluetooth device indicates a health issue or urgent situation.

Figure 2:
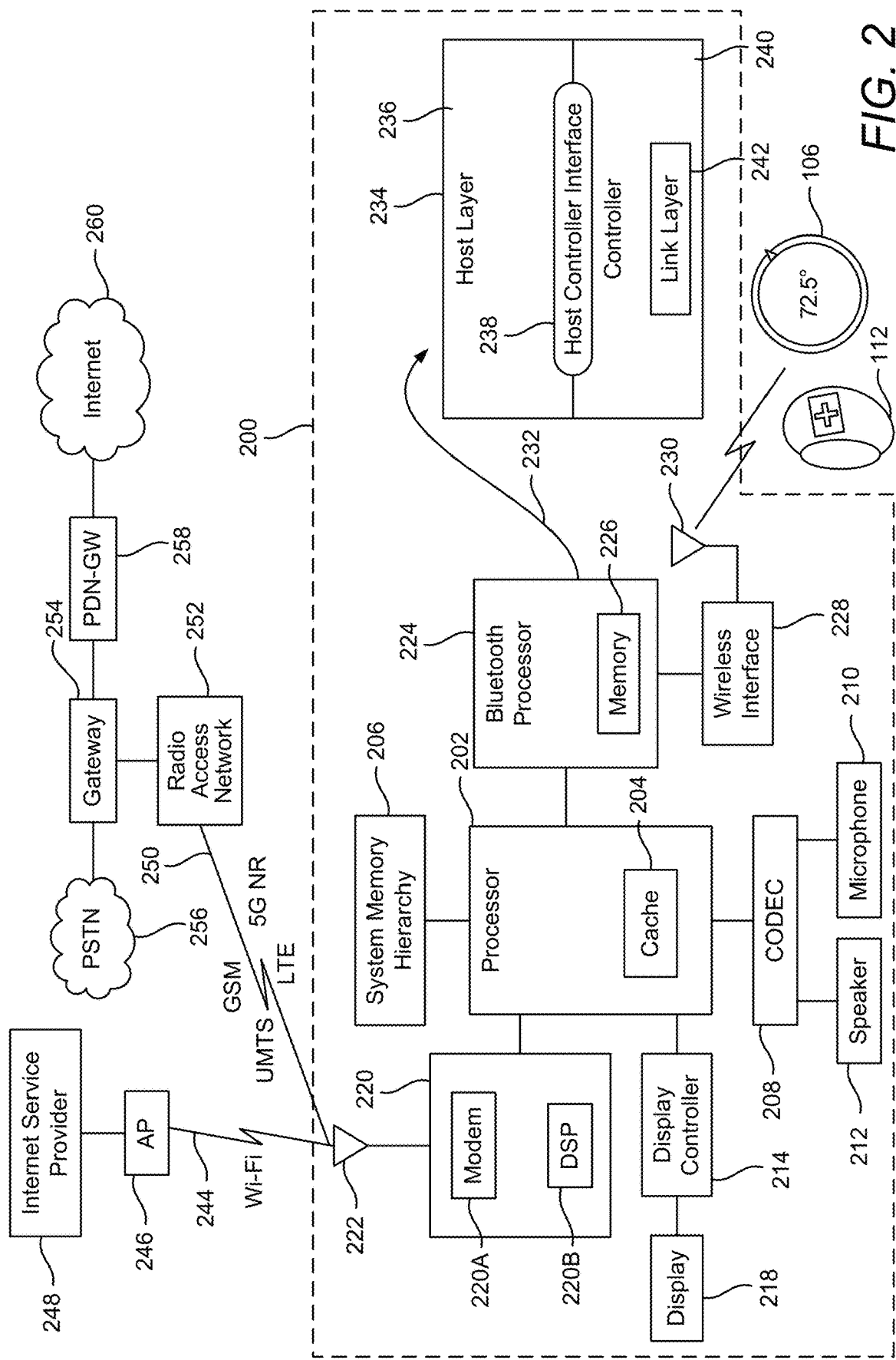
FIG. 2 illustrates a simplified diagram of an exemplary architecture of a device capable of implementing the techniques described herein.

FIG. 2 illustrates a wireless device 200 in which aspects of the disclosure may find application. The wireless device 200 may be any one of a number of communication devices, such as a smartphone, tablet, or laptop, to name a few examples. The wireless device 200 may be a controller wireless device or a peripheral wireless device, or may at times operate as a controller wireless device or a peripheral wireless device. The main processor 202 for the wireless device runs applications visible to the user of the wireless device and includes a cache memory 204 as well as an interface to store and retrieve data and instructions from off-chip memory, represented in FIG. 2 as the system memory hierarchy 206. The system memory hierarchy 206 may comprise various volatile and non-volatile memory systems. Also shown in FIG. 2 is the CODEC (coder-decoder) 208 for interfacing with the microphone 210 and the speaker 212. The display controller 214 provides an interface to the display 218 so that the user may easily interact with the wireless device.

The wireless device 200 is capable of interfacing with other wireless networks by way of a transceiver 220, also referred to as a wireless interface, and one or more antennas 222. The transceiver 220 is illustrated as comprising a modem 220A and a digital signal processor (DSP) 220B, although in practice other kinds of modules may be employed, all or some such modules may be integrated on a single chip, and some of the modules may be integrated with the processor 202.

The main processor 202 may implement a Bluetooth Classic, Bluetooth Smart, and/or Bluetooth Smart Ready protocol stack in which instructions for performing some or all of the protocol stack are stored in the system memory hierarchy 206. However, in the example of FIG. 2, a separate chip or an embedded hardware core, shown as a Bluetooth processor 224, implements the portions of the protocol stack to perform the Bluetooth functionality described herein. The Bluetooth processor 224 comprises a memory 226, shown as an on-chip memory, although the memory 226 may be part of a memory hierarchy in which some memory also resides off-chip. A wireless interface 228 provides an interface to one or more antennas 230, suitable for operating in the designated frequency spectrum utilized by Bluetooth. Communication may be made any number of Bluetooth-capable devices, such as for example the home thermostat 106 or the wristband 112, to name just two examples.

The arrow 232 serves to indicate that the Bluetooth processor 224 performs the protocol stack, represented by the box labeled 234. Shown in the protocol stack 234 are the host layer 236, the host controller interface 238, and the controller 240. The controller 240 includes the link layer 242. For ease of illustration, not all layers are shown. Software or firmware running on the Bluetooth processor 224 may implement all or some of the layers in the protocol stack 234, and special purpose hardware, such as an ASIC, may also implement some of the layers.

It is to be appreciated that the Bluetooth processor 224 may represent more than one processor, where for example a programmable processor may implement the host layer 236 and a DSP may implement some or all of the actions performed by controller 240, except perhaps for the physical layer (not shown). The instructions for implementing some or all of the Bluetooth functionality described herein may be stored in a memory, such as for example the memory 226. The memory 226 may be referred to as a non-transitory computer readable medium.

The wireless device 200 can participate in one or more wireless networks to gain access to the Internet. In the example of FIG. 2, the wireless device 200 has a Wi-Fi link 244 to an access point (AP) 246, where an Internet service provider (ISP) 248 provides access to the Internet.

The wireless device 200 may also have the functionality of a cellular phone so as to participate in any one of a number of cellular networks. For example, the wireless device 200 may have an air interface link 250 that may, for example, be compatible with various cellular networks, such as Global System for Mobile communications (GSM), Universal Mobile Telecommunications Systems (UMTS), Long-Term Evolution (LTE), 5G New Radio (NR), and the like. The air interface link 250 provides communication to a radio access network 252, where the architecture of the radio access network 252 depends upon the type of cellular network standard. For example, in the case of GSM, the radio access network 252 may include a base station, for UMTS it may include a Node-B, for LTE it may include an eNode-B, and for 5G NR it may include a gNode-B, as specified by 3GPP (3rd Generation Partnership Project).

Not all functional units are illustrated in FIG. 2 for providing a connection to the Internet, but for ease of illustration several components are shown, such as the gateway 254 that generically represents several network components for providing communication to the public switched telephone network (PSTN) 256 and the packet data network gateway (PDN-GW) 258, where the PDN-GW 258 provides the proper communication interface to the Internet 260. As is apparent, the network architecture illustrated in FIG. 2 for the Wi-Fi link 244 and the air interface link 250 is simplified for ease of illustration.

Digital bit streams (referred to as channels) are transmitted on RF signals (waveforms) using modulation. Modulation is the process of varying one or more properties of a periodic waveform, referred to as the carrier signal, with a separate signal, referred to as the modulation signal, that typically contains the information to be transmitted. Quadrature amplitude modulation (QAM) is a widely used type of modulation. In QAM, two digital bit streams are transmitted by modulating (changing) the amplitudes of two carrier waves using the amplitude-shift keying (ASK) digital modulation scheme. The two carrier waves are of the same frequency and are out of phase with each other by 90 degrees, a condition known as orthogonality or quadrature. The transmitted signal is created by adding the two carrier waves together. At the receiver, the two waves can be coherently separated (demodulated) because of their orthogonality property.

Bluetooth uses different variations of phase-shift keying (PSK) modulation, a type of QAM, such as n/4-differential quadrature PSK (n/4-DQPSK), also denoted "PI/4DQPSK," and octal DPSK, also denoted "8-DPSK," depending on the application. PSK is a modulation process that conveys data by changing (modulating) the phase of a constant frequency reference signal (the carrier wave). PSK uses a finite number of phases (e.g., 2, 4, 8), each assigned a unique pattern of binary digits. Usually, each phase encodes an equal number of bits. Each pattern of bits forms the symbol that is represented by the particular phase. Thus, for example, the four phases of a quadrature PSK (QPSK) represent the binary digit patterns "00," "01," "10," and "11," and each pattern is referred to as a symbol. The demodulator, which is designed specifically for the symbol-set used by the modulator, determines the phase of the received signal and maps it back to the symbol it represents, thus recovering the original data. A plurality of symbols at the physical/link layer conveys a data packet, with header and payload, at higher layers.

PSK may be either coherent or non-coherent. In coherent PSK (CPSK), the receiver (referred to as a "coherent" receiver) compares the phase of the received signal to a reference signal to determine the phase of the received signal. However, this requires the demodulator to extract the reference waveform from the received signal. In non-coherent PSK, referred to as differential PSK (DPSK), the receiver (referred to as a "differential" receiver) can measure the phase shift of each received symbol with respect to the phase of the previous symbol to determine which symbol the current symbol is. However, while simpler to implement than CPSK, it is more error prone.

Different modulation formats are well suited for transmitters employing polar modulation. A polar modulated transmitter has become a technique that reduces power dissipation and is therefore a favored architecture for low power transceivers. Modulation formats with zero crossings tend to be simple formats with a low channel data rate capability, such as offset QPSK or PI/4DQPSK, which do not have zero crossings. Bluetooth Enhanced Data Rate 3 (EDR3) octal PSK (also denoted "8-PSK," "PSK8," or the like) does have zero crossing and distortion is usually employed to make it suitable for a polar transmitter, but this uses distortion, which is not ideal. The techniques of the present disclosure provide various modulation formats with zero crossings, 16QAM and 8-PSK, to make them both naturally suitable for a polar transmitter architecture with zero crossing avoidance and without any unwanted distortion being required.

Polar modulation is analogous to quadrature modulation in the same way that polar coordinates are analogous to Cartesian coordinates. Quadrature modulation makes use of the Cartesian coordinates x and y, where the x axis is sometimes referred to as the I (in-phase) axis and the y axis is sometimes referred to as the Q (quadrature) axis. Polar modulation makes use of the polar coordinates r (amplitude) and Θ (phase). A polar transmitter transmits data using polar modulation.

Figure 3:
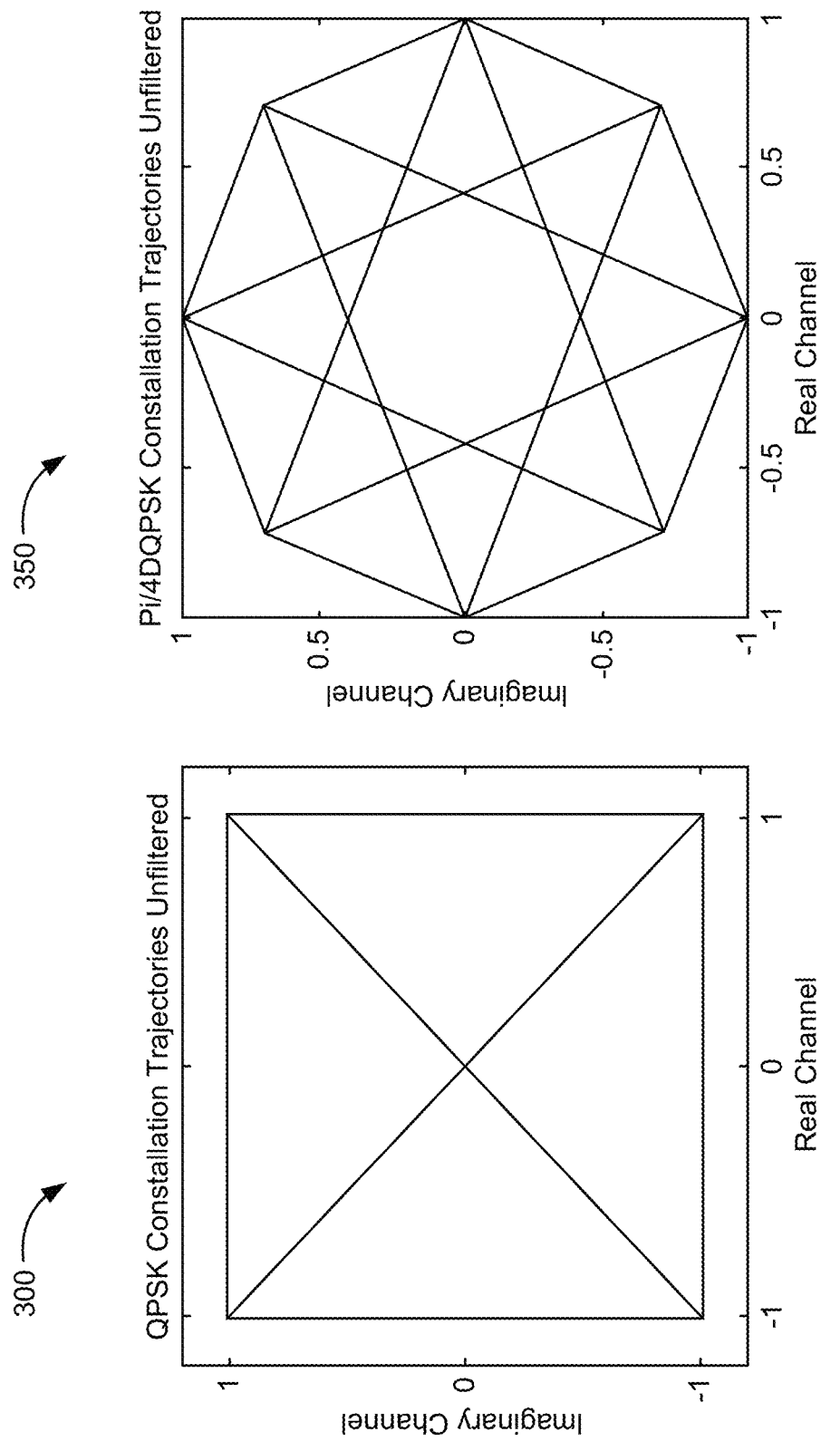
FIG. 3 illustrates a comparison of example quadrature phase-shift keying (QPSK) constellation trajectories to the corresponding PI/4 differential QPSK (PI/4DQPSK) constellation trajectories, according to aspects of the disclosure.

FIG. 3 illustrates a comparison of example QPSK constellation trajectories to the corresponding PI/4DQPSK constellation trajectories, according to aspects of the disclosure. In a QPSK modulation scheme, as illustrated by graph 300, there may be two data channels, a real channel, referred to as "x," and an imaginary channel, referred to as "y," and each channel may carry a data bit of "0" (a voltage of −1) or "1" (a voltage of +1). As such, there are four possible data bit permutations (symbols) for the two channels, specifically, "00," "01," "10," and "11." If the two channels are introduced into a QPSK modulator, the output would be an RF signal with four possible phases. Those four possible phases are represented in graph 300 as the angles from the center of the graph to the corners (the constellation points), specifically, ±45 degrees and ±135 degrees.

The interconnecting lines in graphs 300 and 350 show the possible trajectories between the points of the constellations and the zero crossings through zero amplitude (e.g., at the center of the graph 300). For example, to transmit a "11" and then a "00," the phase of the RF signal passes through the center of the graph 300 (from +45 degrees to −45 degrees), referred to as the "zero crossing." That means that the amplitude of the RF signal would need to change from one phase to the opposite phase, which requires decreasing the amplitude to zero and then increasing it back up again. This is a problem for both Cartesian and polar transmitters (e.g., the power amplifier). For a Cartesian transmitter, for example, any change in amplitude creates a change in phase.

The PI/4DQPSK modulation scheme (illustrated in graph 350) addresses this problem by rotating the QPSK constellation by it/4 or 45 degrees, resulting in eight constellation points instead of four constellation points shown in graph 300. The PI/4DQPSK modulation scheme is used in many applications, including Bluetooth, and is well suited for polar transmitters. However, 16QAM has recently become a requirement of the Bluetooth Special Interest Group (SIG), so there is a pressing requirement to produce a solution for its use by polar transmitters. The same basic principles can be applied to other modulation schemes, such as 16QAM, as to QPSK.

Figure 4:
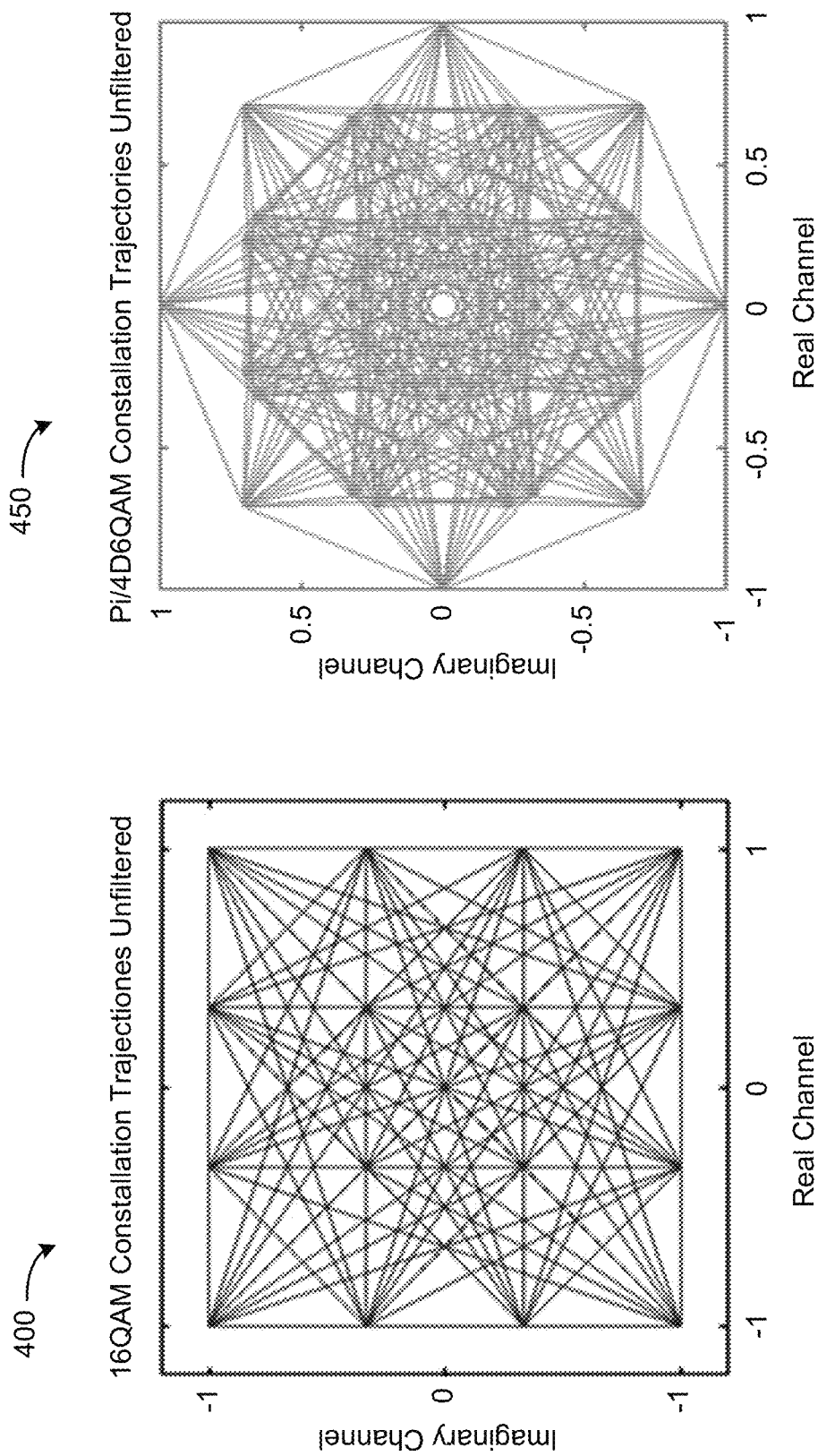
FIG. 4 illustrates a comparison of example 16 quadrature amplitude modulation (16QAM) constellation trajectories to the corresponding PI/4 differential 16QAM (PI/4D16QAM) constellation trajectories, according to aspects of the disclosure.

FIG. 4 illustrates a comparison of example 16QAM constellation trajectories to the corresponding PI/4D16QAM constellation trajectories, according to aspects of the disclosure. The interconnecting lines in graphs 400 and 450 show the possible trajectories between the points of the constellations and the zero crossings through zero amplitude. As illustrated by graph 400, there are 16 constellation points (i.e., 16 possible phases) in a 16QAM modulation scheme. This allows each symbol to carry four bits (e.g., "0000," "0001," "0010," "0011," etc.). As shown in graph 400, there is a zero crossing in a 16QAM modulation scheme.

The 16QAM constellation can be modified to avoid the zero crossing by offsetting alternately transmitted symbols to land on a 16QAM constellation that is rotated by PI/4 or 45 degrees. This results in the PI/4D16QAM constellation shown in graph 450. Notice a small hole is opened in the center of the trajectory diagram of the PI/4D16QAM constellation. The usefulness of the hole is explained below.

Figure 5:
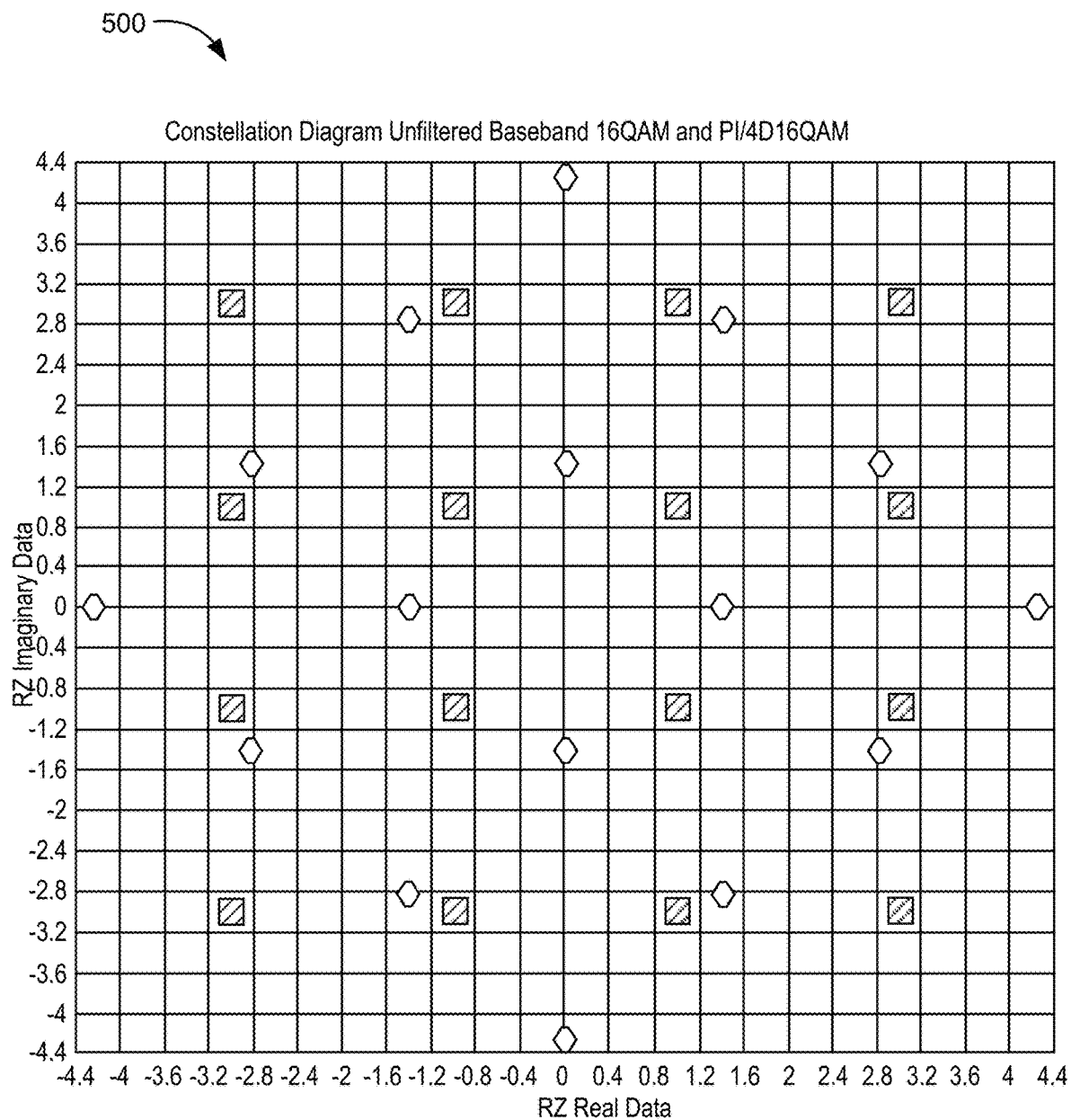
FIG. 5 is a graph showing a constellation diagram for 16QAM and PI/4D16QAM without the trajectory lines, according to aspects of the disclosure.

FIG. 5 is a graph 500 showing a constellation diagram for 16QAM and PI/4D16QAM without the trajectory lines, according to aspects of the disclosure. In FIG. 5, the 16QAM constellation points are represented by squares and the alternate constellation points, rotated by 45 degrees, are represented by circles. In the proposed modulation scheme, alternating symbols are split up and odd symbols use the square constellation points (i.e., the original 16QAM constellation points) and even symbols use the circle constellation points (i.e., the constellation points rotated by PI/4). By going from odd to even to odd to even (e.g., from square constellation point to circle constellation point to square to circle), the amplitude never goes through the center (i.e., there is no zero crossing or zero amplitude). The 16QAM constellation has 16 constellation points, and the resulting constellation, referred to as "PI/4QAM16," has 2*16=32 constellation points.

In the foregoing constellation patterns there is a "D" (e.g., PI/4D16QAM) that refers to differential modulation. Usually this refers to non-coherent differential modulation. With all these modulation formats it should be noted that an error vector magnitude (EVM) performance improvement can be obtained using coherent demodulation. Data can be differentially encoded, however, to obtain the advantage of data demodulation without the use of unique words to resolve ambiguities encountered in carrier recovery methods. The modulation proposed for PI/4D16QAM could also be called PI/4C16QAM, where the "C" stands for "coherent." The present disclosure omits the C and the D from the names of the proposed modulation formats and refers to them simply as, for example, PI/4QAM16, as the proposed formats can be used with a non-coherent differential, coherent differential, or coherent non-differential transmitter.

Figure 6:
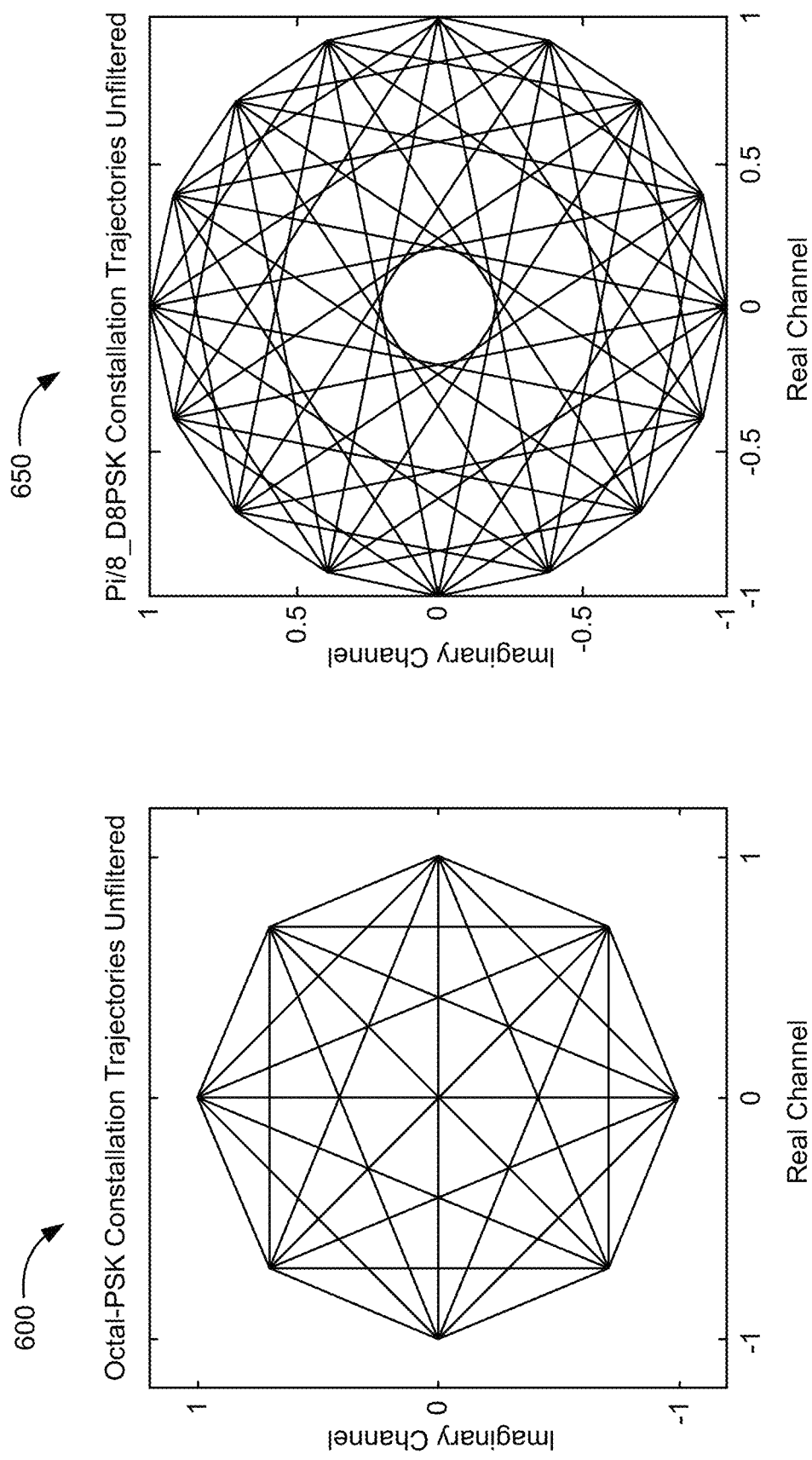
FIG. 6 illustrates the disclosed technique applied to 16QAM and PI/4QAM16 shown in FIG. 5 applied to octal-PSK, according to aspects of the disclosure.

FIG. 6 illustrates the disclosed technique applied to 16QAM and PI/4QAM16 shown in FIG. 5 applied to octal-PSK, according to aspects of the disclosure. Currently, an artificial hole is opened in 8-PSK for Bluetooth when used by a polar transmitter, but this creates unwanted phase distortion and impacts the bit rate. The distortion can be removed using the same technique described above with reference to FIG. 5, thereby creating a new modulation format referred to as "PI/8PSK8." The same advantage is obtained by rotating the 8-PSK constellation (shown in graph 600) by PI/8, or 22.5 degrees, to produce a zero-crossing avoidance area in the center of the resulting trajectory diagram (shown in graph 650).

The advantage gained through constellation modification in PI/4QAM16 and PI/4PSK8 can be lost, however, if the root raised cosine (RRC) roll-off (RO) factors of the channel filters are not selected carefully (see FIGS. 10 and 11 below). The standard channel filter to use with PSK modulation formats is the raised cosine response, where the square root of raised cosine filters are used in both the transmitter (Tx) and receiver (Rx). Due to the impulse response tails from these filters, the area opened can be closed if the roll-off factor of the filters used is not chosen carefully. The filters found to widen the zero-crossing avoidance area were with roll-off factors between 70% and 80%.

Figure 7:
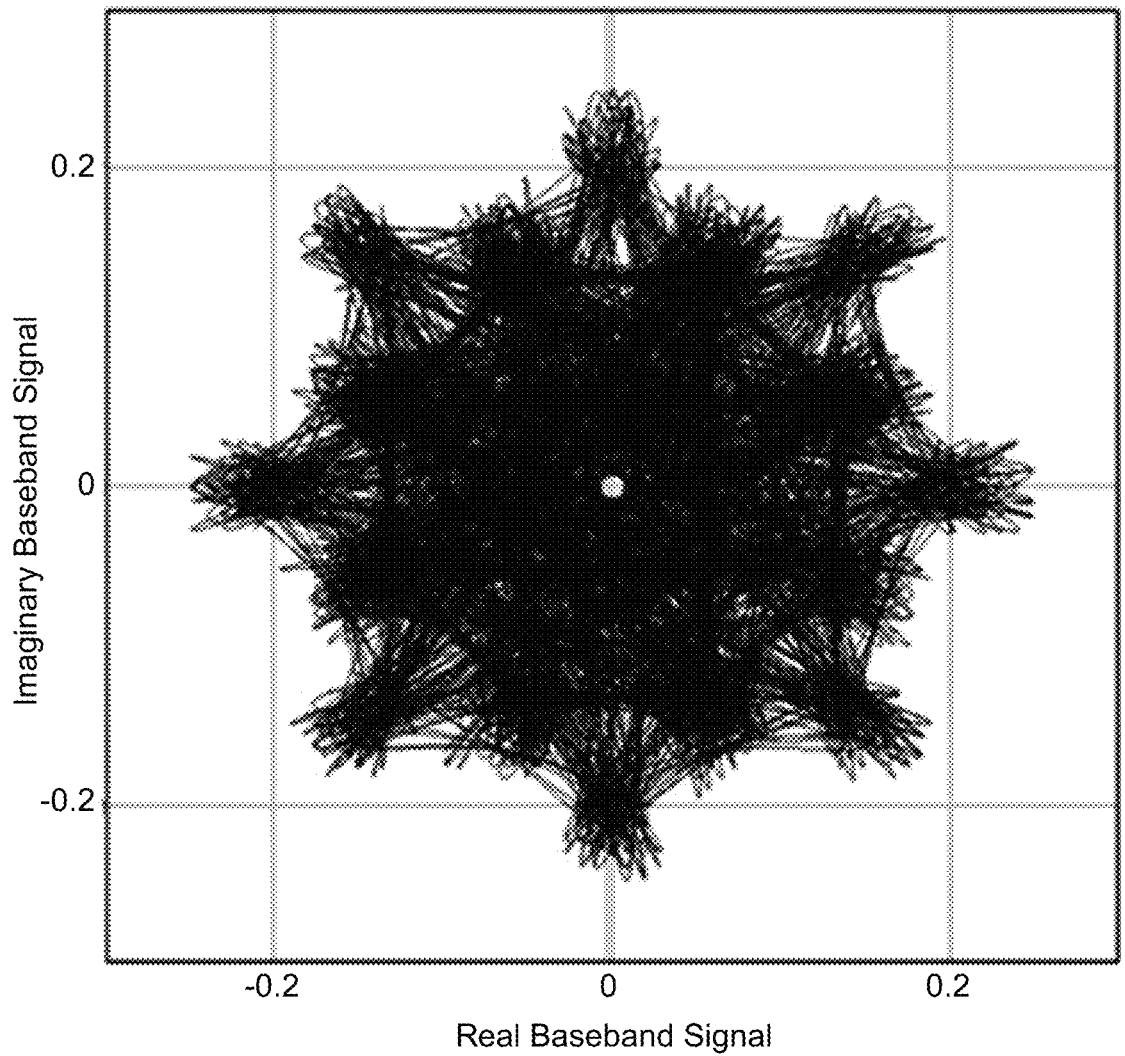
FIG. 7 is a graph showing the down-converted transmit constellation trajectories for PI/4QAM16 with a 70% root raised cosine (RRC) response, according to aspects of the disclosure.

FIG. 7 is a graph 700 showing the down-converted transmit constellation trajectories for PI/4QAM16 with a 70% RRC response, according to aspects of the disclosure. The open area in the center shows the cleared area useful for polar transmitter operation.

Figure 8:
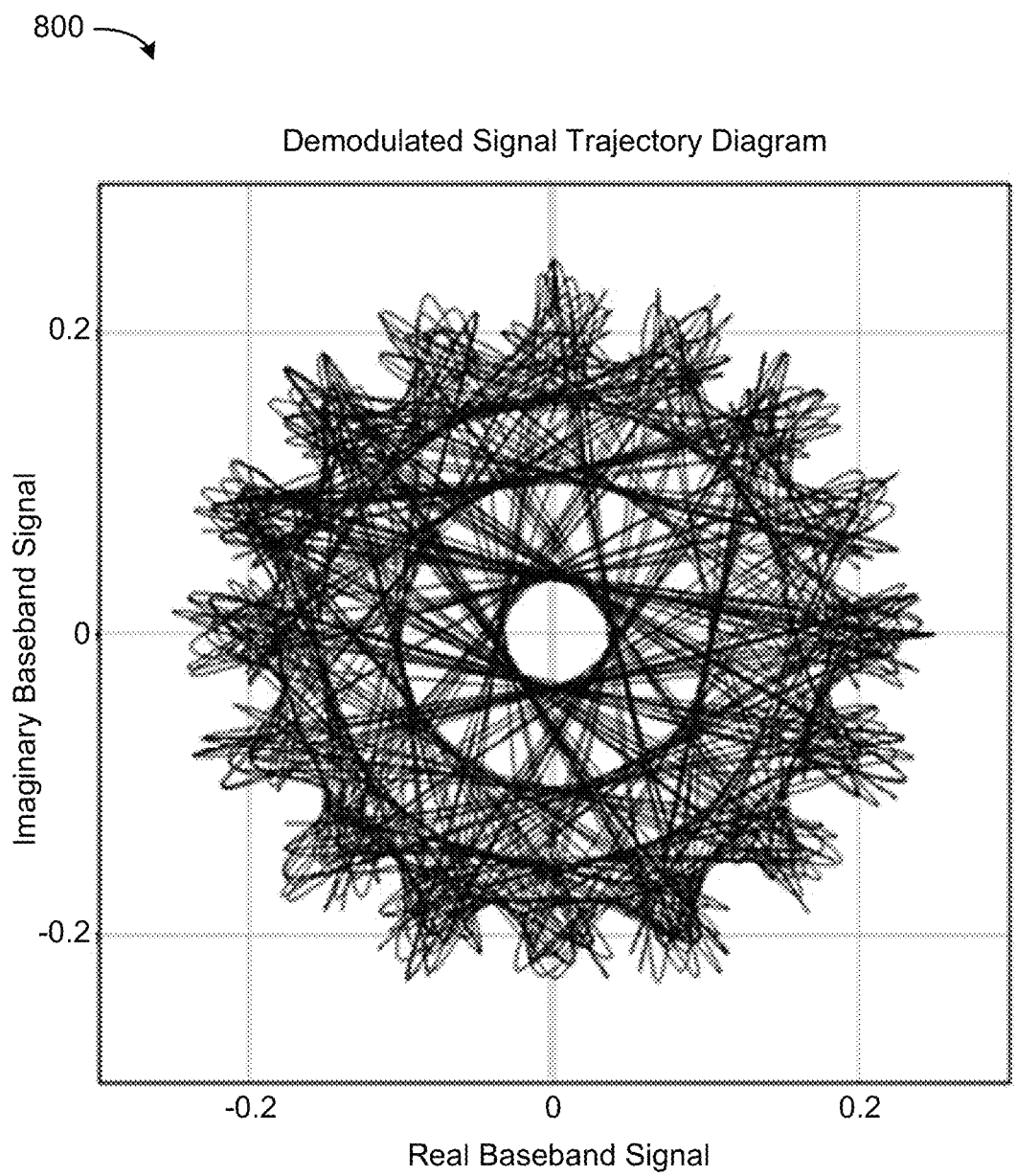
FIG. 8 is a graph showing the down-converted transmit constellation trajectories for PI/8PSK8 with a close to optimum 70% RRC response, according to aspects of the disclosure.

FIG. 8 is a graph 800 showing the down-converted transmit constellation trajectories for PI/8PSK8 with a close to optimum 70% RRC response, according to aspects of the disclosure. The open area in the center again shows the cleared area useful for polar transmitter operation, which in this case is now larger, making the circuit design for a polar transmitter less demanding.

Figure 10:
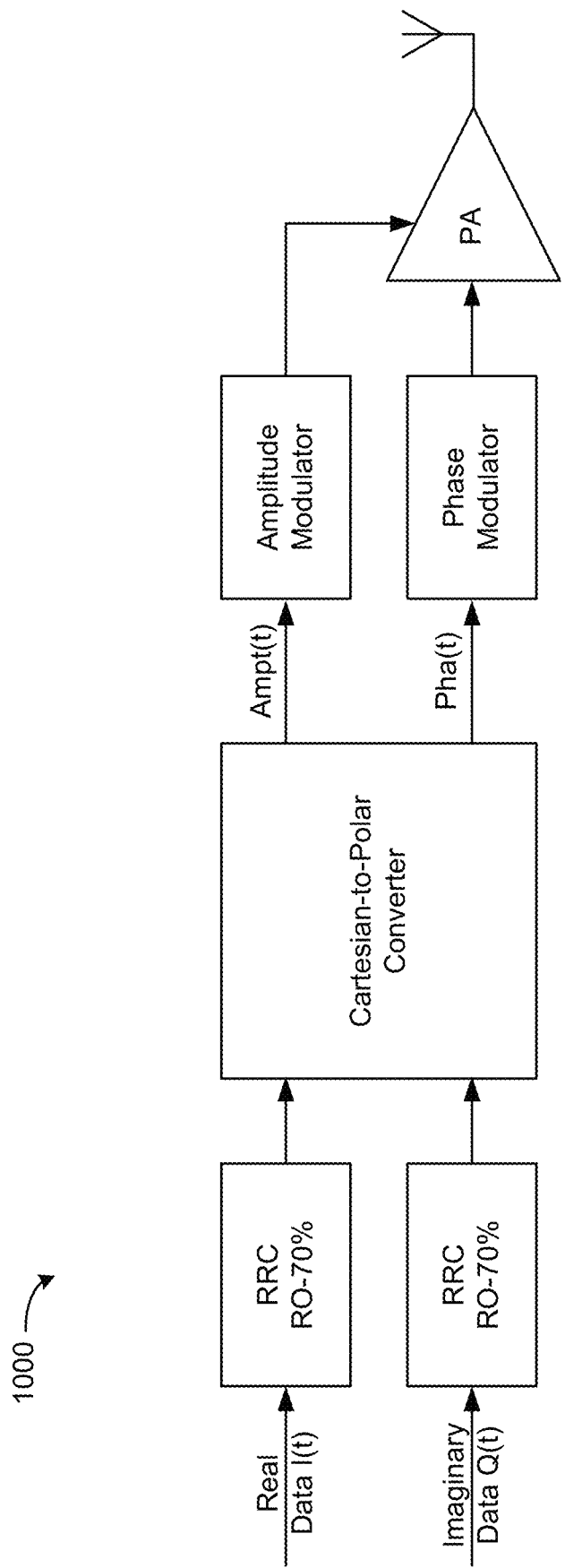
FIG. 10 is a diagram illustrating how the modulations described herein can be implemented in a polar transmitter, according to aspects of the disclosure.

Polar transmitters have an integral frequency modulator (FM) generator (or phase modulator (PM), as shown in FIG. 10) to produce the modulation where the maximum frequency deviation needs to be limited for a practical circuit implementation. Consider the analogy where two comets A and B are both travelling at the same speed but one is approaching much closer to the Earth (comet A). When the comets are far away, an observer on Earth does not need to move their head very much to follow either comet. The angular movement of the observer's head to follow comet B speeds up slightly as comet B passes the Earth, whereas the angular movement of the observer's head as comet A passes the Earth needs to be much faster. Following comet A is like having a small trajectory hole (e.g., as shown in graph 700) and following comet B is like having a large trajectory hole (e.g., as shown in graph 800). When transferred back to the modulation context, comet A would have a larger peak frequency deviation than comet B for the earthbound observer.

Figure 9:
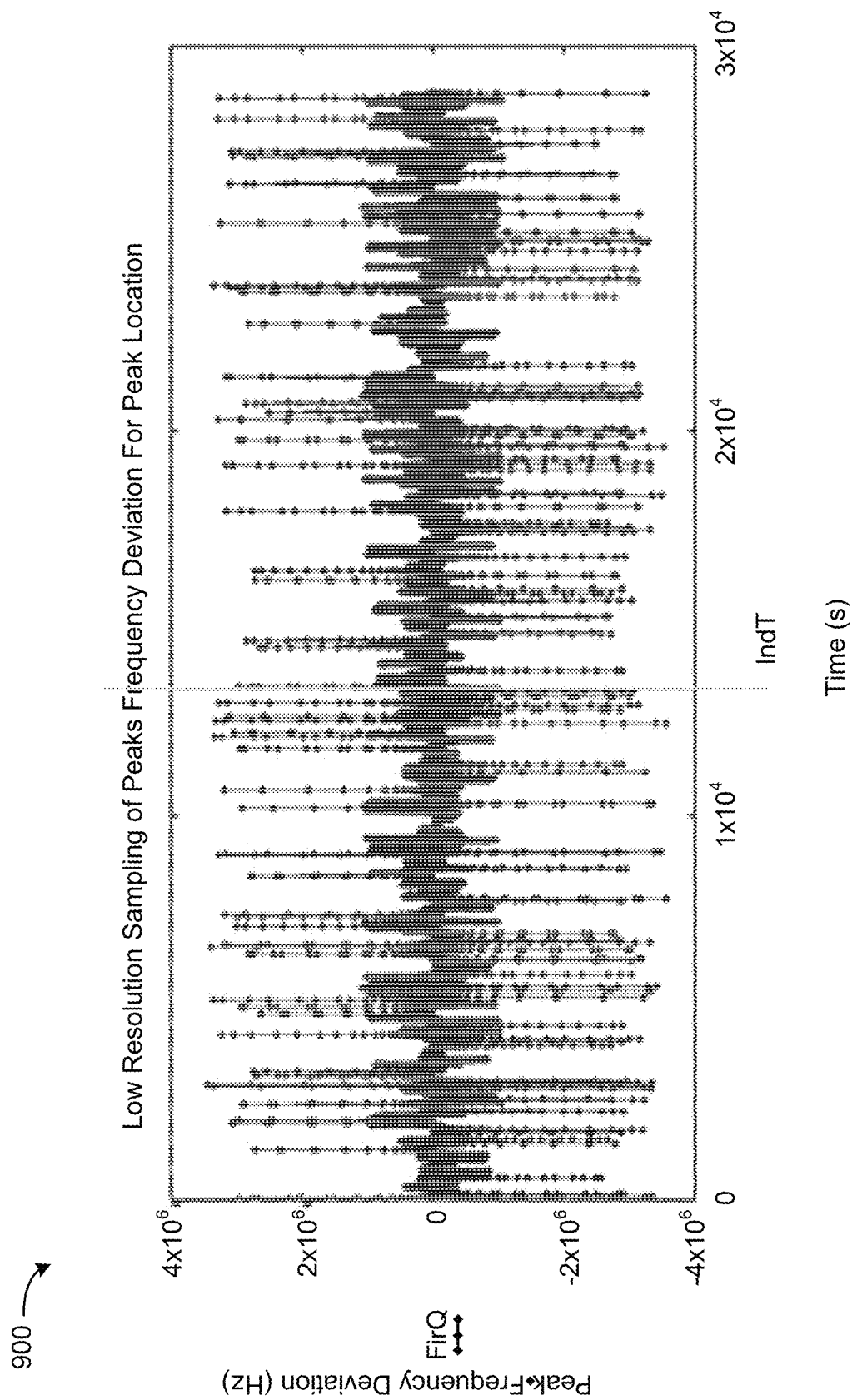
FIG. 9 illustrates an example plot of frequency deviation for PI/4QAM16 for a random stream of data that produces a peak frequency deviation as a figure of merit for the proposed modulation format, according to aspects of the disclosure.

FIG. 9 illustrates an example plot 900 of frequency deviation for PI/4QAM16 for a random stream of data that produces a peak frequency deviation as a figure of merit for the proposed modulation format, according to aspects of the disclosure. As will be described with reference to FIG. 9, the lower the peak frequency deviation the less demanding for the polar transmitter circuits. For example, a 1 megabaud (Mbaud) modulation with PI/4QAM16, as is shown, will have a peak frequency of about 4 megahertz (MHz). If the bandwidth of the modulation format was doubled for double the data rate, the peak frequencies would also be doubled. Higher data rates will produce a higher peak frequency requirement.

FIG. 10 is a diagram 1000 illustrating how the modulations described herein can be implemented in a polar transmitter, according to aspects of the disclosure. In the example of FIG. 10, a QPSK modulation scheme is used. As noted above, there are two binary data input channels for QPSK, with "x" and "y" or "R" and "I" or "Q" and "I" being common ways to label them. Input voltages of, for example, −1 V and +1 V are inputted to each channel corresponding to logic levels of "0" and "1," respectively. For QPSK, the trajectory diagram in graph 300 is applicable. The input data permutations for QPSK are "00," "01," "10," and "11," and these, when applied to the Cartesian-to-polar converter, produce an RF signal with relative phases of +/−45 and +/−135 degrees. As such, from opposite corners of the trajectory diagram (with some filtering), a transition through the center produces a zero-amplitude condition, meaning the modulation has a large amplitude variation. Even in a Cartesian transmitter, the amplitude variation can produce extra unwanted phase deviation due to the unwanted amplitude modulator (AM) to phase modulator (PM) characteristic of the power amplifier (PA). In a polar transmitter, there is a phase modulator that, like a frequency modulator (FM), will have some maximum instantaneous frequency deviation that, from a practical implementation viewpoint, has a practical limit. Peak frequency deviation should therefore be limited in any modulation format. With normal 16QAM and 8PSK, there would be no practical limit to the required frequency deviation, but with the proposed modulation formats of PI/4QAM16 and PI/8PSK8, the frequency deviation is limited to practically achievable values without any system bit error rate (BER) degradation. Other zero crossing modulation formats could also use this same technique.

Figure 11:
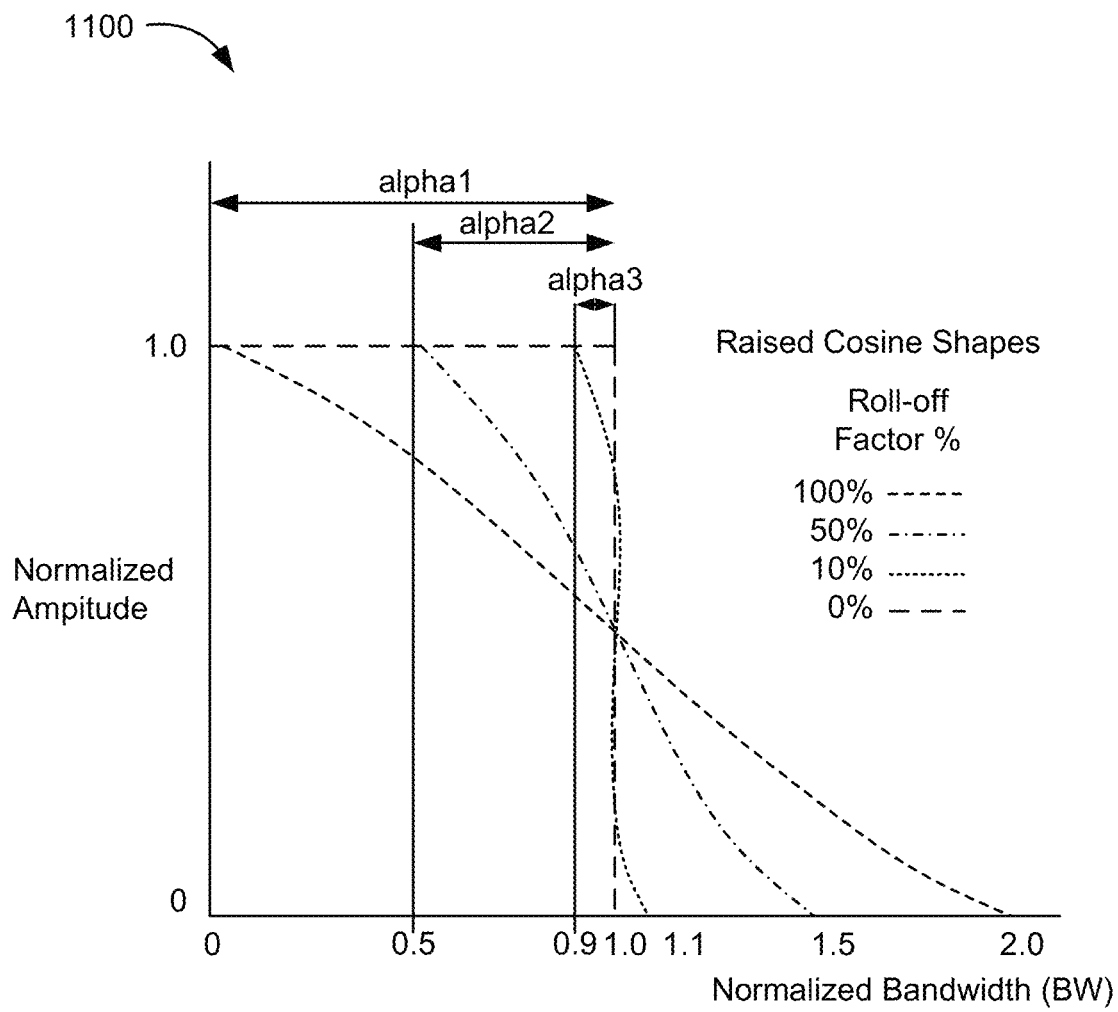
FIG. 11 illustrates the shape of a full raised cosine (FRC) filter usually used in a PSK type transmitter, according to aspects of the disclosure.

FIG. 11 illustrates the shape of a full raised cosine (FRC) filter usually used in a PSK type transmitter, according to aspects of the disclosure. The square root of this response is usually put into the transmitter (Tx) and the receiver (Rx) as the RRC so that when a signal from a transmitter is received at the receiver, the overall baseband shaping is FRC.

Figure 12:
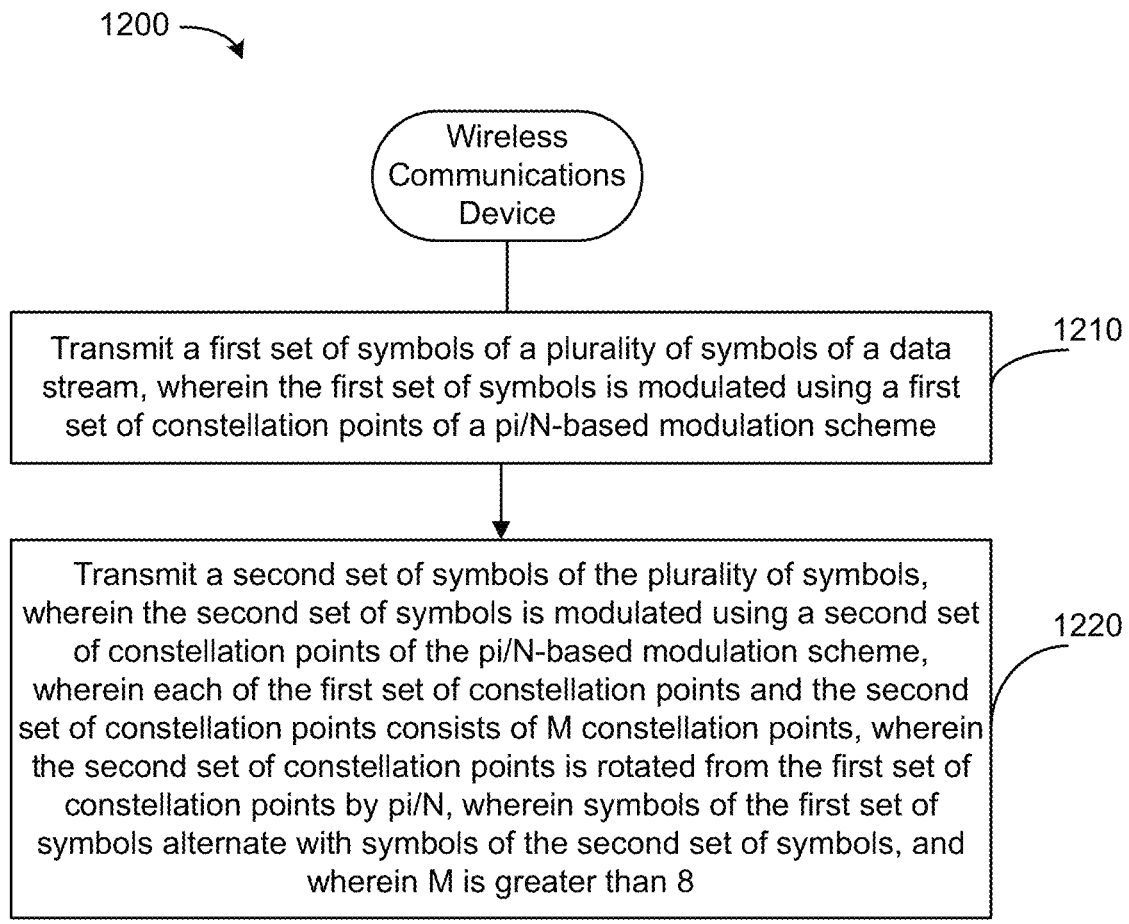
FIGS. 12 and 13 illustrate example methods of wireless communication, according to aspects of the disclosure.

FIG. 12 illustrates an example method 1200 of wireless communication, according to aspects of the disclosure. In an aspect, method 1200 may be performed by a wireless communications device (e.g., any of the UEs, base stations, access points, etc. described herein).

At 1210, the wireless communications device transmits a first set of symbols of a plurality of symbols of a data stream, wherein the first set of symbols is modulated using a first set of constellation points of a pi/N-based modulation scheme. In an aspect, operation 1210 may be performed by the Bluetooth processor 224, the memory 226, the wireless interface 228, and/or the wireless interface 228, any or all of which may be considered means for performing this operation.

At 1220, the wireless communications device transmits a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8. In an aspect, operation 1220 may be performed by the Bluetooth processor 224, the memory 226, the wireless interface 228, and/or the wireless interface 228, any or all of which may be considered means for performing this operation.

Figure 13:
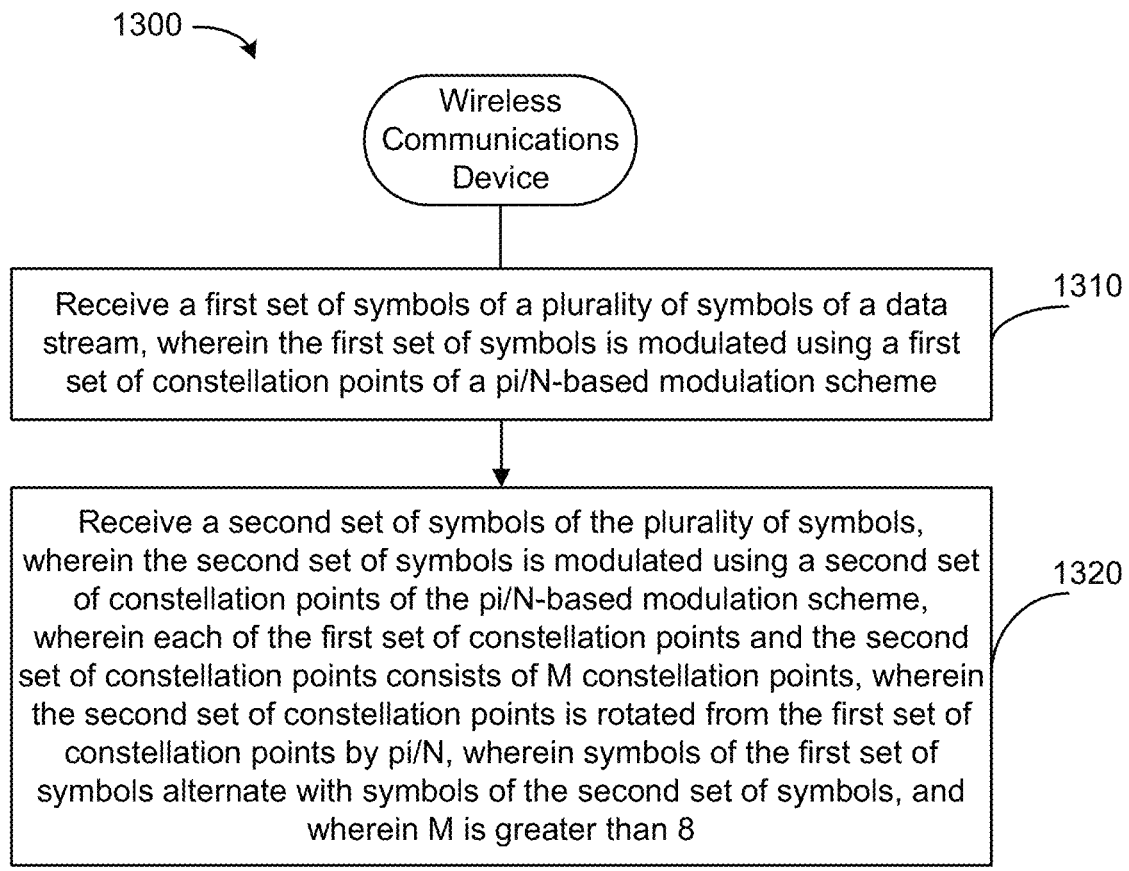

FIG. 13 illustrates an example method 1300 of wireless communication, according to aspects of the disclosure. In an aspect, method 1300 may be performed by a wireless communications device (e.g., any of the UEs, base stations, access points, etc. described herein).

At 1310, the wireless communications device receives a first set of symbols of a plurality of symbols of a data stream, wherein the first set of symbols is modulated using a first set of constellation points of a pi/N-based modulation scheme. In an aspect, operation 1310 may be performed by the Bluetooth processor 224, the memory 226, the wireless interface 228, and/or the wireless interface 228, any or all of which may be considered means for performing this operation.

At 1310, the wireless communications device receives a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8. In an aspect, operation 1310 may be performed by the Bluetooth processor 224, the memory 226, the wireless interface 228, and/or the wireless interface 228, any or all of which may be considered means for performing this operation.

As will be appreciated, a technical advantage of the methods 1200 and 1300 is that they solve the zero-crossing problem for polar transmitters and allow lower power dissipation transmitters to be used with more complex modulation formats without degrading either EVM or adjacent channel performances.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a wireless communications device, comprising: transmitting a first set of symbols of a plurality of symbols of a data stream, wherein the first set of symbols is modulated using a first set of constellation points of a pi/N-based modulation scheme; and transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 2. The method of clause 1, wherein: the first set of symbols consists of M odd-numbered symbols of the plurality of symbols, and the second set of symbols consists of M even-numbered symbols of the plurality of symbols.

Clause 3. The method of clause 1, wherein: the first set of symbols consists of M even-numbered symbols of the plurality of symbols, and the second set of symbols consists of M odd-numbered symbols of the plurality of symbols.

Clause 4. The method of any of clauses 1 to 3, wherein the pi/N-based modulation scheme is a pi/N-based phase-shift keying (PSK) modulation scheme.

Clause 5. The method of clause 4, wherein: N is 8, M is 8, and the pi/N-based PSK modulation scheme comprises a pi/8 octal PSK (PI/8PSK8) modulation scheme.

Clause 6. The method of clause 5, wherein the first set of constellation points comprises constellation points of an octal PSK (PSK8) modulation scheme.

Clause 7. The method of clause 1, wherein the pi/N-based modulation scheme is a pi/N-based quadrature amplitude modulation (QAM) modulation scheme.

Clause 8. The method of clause 7, wherein: N is 4, M is 16, and the pi/N-based QAM modulation scheme comprises a pi/4 16QAM (PI/4QAM16) modulation scheme.

Clause 9. The method of clause 8, wherein the first set of constellation points comprises constellation points of a 16QAM modulation scheme.

Clause 10. The method of any of clauses 1 to 9, wherein the first set of symbols and the second set of symbols are transmitted by a power amplifier of the wireless communications device.

Clause 11. The method of any of clauses 1 to 10, wherein the first set of symbols and the second set of symbols are transmitted using raised root cosine (RRC) roll-off factors between 70% and 80%.

Clause 12. The method of any of clauses 1 to 11, wherein the first set of symbols and the second set of symbols being transmitted on the first set of constellation points and the second set of constellation points, respectively, produces a zero-crossing avoidance area at a center of the first set of constellation points and the second set of constellation points.

Clause 13. A method of wireless communication performed by a wireless communications device, comprising: receiving a first set of symbols of a plurality of symbols of a data stream, wherein the first set of symbols is modulated using a first set of constellation points of a pi/N-based modulation scheme; and receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 14. The method of clause 13, wherein: the first set of symbols consists of M odd-numbered symbols of the plurality of symbols, and the second set of symbols consists of M even-numbered symbols of the plurality of symbols.

Clause 15. The method of clause 13, wherein: the first set of symbols consists of M even-numbered symbols of the plurality of symbols, and the second set of symbols consists of M odd-numbered symbols of the plurality of symbols.

Clause 16. The method of any of clauses 13 to 15, wherein the pi/N-based modulation scheme is a pi/N-based phase-shift keying (PSK) modulation scheme.

Clause 17. The method of clause 16, wherein: N is 8, M is 8, and the pi/N-based PSK modulation scheme comprises a pi/8 octal PSK (PI/8PSK8) modulation scheme.

Clause 18. The method of clause 17, wherein the first set of constellation points comprises constellation points of an octal PSK (PSK8) modulation scheme.

Clause 19. The method of clause 13, wherein the pi/N-based modulation scheme is a pi/N-based quadrature amplitude modulation (QAM) modulation scheme.

Clause 20. The method of clause 19, wherein: N is 4, M is 16, and the pi/N-based QAM modulation scheme comprises a pi/4 16QAM (PI/4QAM16) modulation scheme.

Clause 21. The method of clause 20, wherein the first set of constellation points comprises constellation points of a 16QAM modulation scheme.

Clause 22. The method of any of clauses 13 to 21, wherein the first set of symbols and the second set of symbols are received using raised root cosine (RRC) roll-off factors between 70% and 80%.

Clause 23. A wireless communications device, comprising: a memory; at least one transceiver; and at least one processor communicatively coupled to the memory and the at least one transceiver, the at least one processor configured to: transmit, via the at least one transceiver, a first set of symbols of a plurality of symbols of a data stream, wherein the first set of symbols is modulated using a first set of constellation points of a pi/N-based modulation scheme; and transmit, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 24. The wireless communications device of clause 23, wherein: the first set of symbols consists of M odd-numbered symbols of the plurality of symbols, and the second set of symbols consists of M even-numbered symbols of the plurality of symbols.

Clause 25. The wireless communications device of clause 23, wherein: the first set of symbols consists of M even-numbered symbols of the plurality of symbols, and the second set of symbols consists of M odd-numbered symbols of the plurality of symbols.

Clause 26. The wireless communications device of any of clauses 23 to 25, wherein the pi/N-based modulation scheme is a pi/N-based phase-shift keying (PSK) modulation scheme.

Clause 27. The wireless communications device of clause 26, wherein: N is 8, M is 8, and the pi/N-based PSK modulation scheme comprises a pi/8 octal PSK (PI/8PSK8) modulation scheme.

Clause 28. The wireless communications device of clause 27, wherein the first set of constellation points comprises constellation points of an octal PSK (PSK8) modulation scheme.

Clause 29. The wireless communications device of clause 23, wherein the pi/N-based modulation scheme is a pi/N-based quadrature amplitude modulation (QAM) modulation scheme.

Clause 30. The wireless communications device of clause 29, wherein: N is 4, M is 16, and the pi/N-based QAM modulation scheme comprises a pi/4 16QAM (PI/4QAM16) modulation scheme.

Clause 31. The wireless communications device of clause 30, wherein the first set of constellation points comprises constellation points of a 16QAM modulation scheme.

Clause 32. The wireless communications device of any of clauses 23 to 31, wherein the first set of symbols and the second set of symbols are transmitted by a power amplifier of the wireless communications device.

Clause 33. The wireless communications device of any of clauses 23 to 32, wherein the first set of symbols and the second set of symbols are transmitted using raised root cosine (RRC) roll-off factors between 70% and 80%.

Clause 34. The wireless communications device of any of clauses 23 to 33, wherein the first set of symbols and the second set of symbols being transmitted on the first set of constellation points and the second set of constellation points, respectively, produces a zero-crossing avoidance area at a center of the first set of constellation points and the second set of constellation points.

Clause 35. A wireless communications device, comprising: a memory; at least one transceiver; and at least one processor communicatively coupled to the memory and the at least one transceiver, the at least one processor configured to: receive, via the at least one transceiver, a first set of symbols of a plurality of symbols of a data stream, wherein the first set of symbols is modulated using a first set of constellation points of a pi/N-based modulation scheme; and receive, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 36. The wireless communications device of clause 35, wherein: the first set of symbols consists of M odd-numbered symbols of the plurality of symbols, and the second set of symbols consists of M even-numbered symbols of the plurality of symbols.

Clause 37. The wireless communications device of clause 35, wherein: the first set of symbols consists of M even-numbered symbols of the plurality of symbols, and the second set of symbols consists of M odd-numbered symbols of the plurality of symbols.

Clause 38. The wireless communications device of any of clauses 35 to 37, wherein the pi/N-based modulation scheme is a pi/N-based phase-shift keying (PSK) modulation scheme.

Clause 39. The wireless communications device of clause 38, wherein: N is 8, M is 8, and the pi/N-based PSK modulation scheme comprises a pi/8 octal PSK (PI/8PSK8) modulation scheme.

Clause 40. The wireless communications device of clause 39, wherein the first set of constellation points comprises constellation points of an octal PSK (PSK8) modulation scheme.

Clause 41. The wireless communications device of clause 35, wherein the pi/N-based modulation scheme is a pi/N-based quadrature amplitude modulation (QAM) modulation scheme.

Clause 42. The wireless communications device of clause 41, wherein: N is 4, M is 16, and the pi/N-based QAM modulation scheme comprises a pi/4 16QAM (PI/4QAM16) modulation scheme.

Clause 43. The wireless communications device of clause 42, wherein the first set of constellation points comprises constellation points of a 16QAM modulation scheme.

Clause 44. The wireless communications device of any of clauses 35 to 43, wherein the first set of symbols and the second set of symbols are received using raised root cosine (RRC) roll-off factors between 70% and 80%.

Clause 45. A wireless communications device, comprising: means for transmitting a first set of symbols of a plurality of symbols of a data stream, wherein the first set of symbols is modulated using a first set of constellation points of a pi/N-based modulation scheme; and means for transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 46. The wireless communications device of clause 45, wherein: the first set of symbols consists of M odd-numbered symbols of the plurality of symbols, and the second set of symbols consists of M even-numbered symbols of the plurality of symbols.

Clause 47. The wireless communications device of clause 45, wherein: the first set of symbols consists of M even-numbered symbols of the plurality of symbols, and the second set of symbols consists of M odd-numbered symbols of the plurality of symbols.

Clause 48. The wireless communications device of any of clauses 45 to 47, wherein the pi/N-based modulation scheme is a pi/N-based phase-shift keying (PSK) modulation scheme.

Clause 49. The wireless communications device of clause 48, wherein: N is 8, M is 8, and the pi/N-based PSK modulation scheme comprises a pi/8 octal PSK (PI/8PSK8) modulation scheme.

Clause 50. The wireless communications device of clause 49, wherein the first set of constellation points comprises constellation points of an octal PSK (PSK8) modulation scheme.

Clause 51. The wireless communications device of clause 45, wherein the pi/N-based modulation scheme is a pi/N-based quadrature amplitude modulation (QAM) modulation scheme.

Clause 52. The wireless communications device of clause 51, wherein: N is 4, M is 16, and the pi/N-based QAM modulation scheme comprises a pi/4 16QAM (PI/4QAM16) modulation scheme.

Clause 53. The wireless communications device of clause 52, wherein the first set of constellation points comprises constellation points of a 16QAM modulation scheme.

Clause 54. The wireless communications device of any of clauses 45 to 53, wherein the first set of symbols and the second set of symbols are transmitted by a power amplifier of the wireless communications device.

Clause 55. The wireless communications device of any of clauses 45 to 54, wherein the first set of symbols and the second set of symbols are transmitted using raised root cosine (RRC) roll-off factors between 70% and 80%.

Clause 56. The wireless communications device of any of clauses 45 to 55, wherein the first set of symbols and the second set of symbols being transmitted on the first set of constellation points and the second set of constellation points, respectively, produces a zero-crossing avoidance area at a center of the first set of constellation points and the second set of constellation points.

Clause 57. A wireless communications device, comprising: means for receiving a first set of symbols of a plurality of symbols of a data stream, wherein the first set of symbols is modulated using a first set of constellation points of a pi/N-based modulation scheme; and means for receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 58. The wireless communications device of clause 57, wherein: the first set of symbols consists of M odd-numbered symbols of the plurality of symbols, and the second set of symbols consists of M even-numbered symbols of the plurality of symbols.

Clause 59. The wireless communications device of clause 57, wherein: the first set of symbols consists of M even-numbered symbols of the plurality of symbols, and the second set of symbols consists of M odd-numbered symbols of the plurality of symbols.

Clause 60. The wireless communications device of any of clauses 57 to 59, wherein the pi/N-based modulation scheme is a pi/N-based phase-shift keying (PSK) modulation scheme.

Clause 61. The wireless communications device of clause 60, wherein: N is 8, M is 8, and the pi/N-based PSK modulation scheme comprises a pi/8 octal PSK (PI/8PSK8) modulation scheme.

Clause 62. The wireless communications device of clause 61, wherein the first set of constellation points comprises constellation points of an octal PSK (PSK8) modulation scheme.

Clause 63. The wireless communications device of clause 57, wherein the pi/N-based modulation scheme is a pi/N-based quadrature amplitude modulation (QAM) modulation scheme.

Clause 64. The wireless communications device of clause 63, wherein: N is 4, M is 16, and the pi/N-based QAM modulation scheme comprises a pi/4 16QAM (PI/4QAM16) modulation scheme.

Clause 65. The wireless communications device of clause 64, wherein the first set of constellation points comprises constellation points of a 16QAM modulation scheme.

Clause 66. The wireless communications device of any of clauses 57 to 65, wherein the first set of symbols and the second set of symbols are received using raised root cosine (RRC) roll-off factors between 70% and 80%.

Clause 67. A non-transitory computer-readable medium storing computer-executable instructions that, when executed by a wireless communications device, cause the wireless communications device to: transmit a first set of symbols of a plurality of symbols of a data stream, wherein the first set of symbols is modulated using a first set of constellation points of a pi/N-based modulation scheme; and transmit a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 68. The non-transitory computer-readable medium of clause 67, wherein: the first set of symbols consists of M odd-numbered symbols of the plurality of symbols, and the second set of symbols consists of M even-numbered symbols of the plurality of symbols.

Clause 69. The non-transitory computer-readable medium of clause 67, wherein: the first set of symbols consists of M even-numbered symbols of the plurality of symbols, and the second set of symbols consists of M odd-numbered symbols of the plurality of symbols.

Clause 70. The non-transitory computer-readable medium of any of clauses 67 to 69, wherein the pi/N-based modulation scheme is a pi/N-based phase-shift keying (PSK) modulation scheme.

Clause 71. The non-transitory computer-readable medium of clause 70, wherein: N is 8, M is 8, and the pi/N-based PSK modulation scheme comprises a pi/8 octal PSK (PI/8PSK8) modulation scheme.

Clause 72. The non-transitory computer-readable medium of clause 71, wherein the first set of constellation points comprises constellation points of an octal PSK (PSK8) modulation scheme.

Clause 73. The non-transitory computer-readable medium of clause 67, wherein the pi/N-based modulation scheme is a pi/N-based quadrature amplitude modulation (QAM) modulation scheme.

Clause 74. The non-transitory computer-readable medium of clause 73, wherein: N is 4, M is 16, and the pi/N-based QAM modulation scheme comprises a pi/4 16QAM (PI/4QAM16) modulation scheme.

Clause 75. The non-transitory computer-readable medium of clause 74, wherein the first set of constellation points comprises constellation points of a 16QAM modulation scheme.

Clause 76. The non-transitory computer-readable medium of any of clauses 67 to 75, wherein the first set of symbols and the second set of symbols are transmitted by a power amplifier of the wireless communications device.

Clause 77. The non-transitory computer-readable medium of any of clauses 67 to 76, wherein the first set of symbols and the second set of symbols are transmitted using raised root cosine (RRC) roll-off factors between 70% and 80%.

Clause 78. The non-transitory computer-readable medium of any of clauses 67 to 77, wherein the first set of symbols and the second set of symbols being transmitted on the first set of constellation points and the second set of constellation points, respectively, produces a zero-crossing avoidance area at a center of the first set of constellation points and the second set of constellation points.

Clause 79. A non-transitory computer-readable medium storing computer-executable instructions that, when executed by a wireless communications device, cause the wireless communications device to: receive a first set of symbols of a plurality of symbols of a data stream, wherein the first set of symbols is modulated using a first set of constellation points of a pi/N-based modulation scheme; and receive a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, and wherein M is greater than 8.

Clause 80. The non-transitory computer-readable medium of clause 79, wherein: the first set of symbols consists of M odd-numbered symbols of the plurality of symbols, and the second set of symbols consists of M even-numbered symbols of the plurality of symbols.

Clause 81. The non-transitory computer-readable medium of clause 79, wherein: the first set of symbols consists of M even-numbered symbols of the plurality of symbols, and the second set of symbols consists of M odd-numbered symbols of the plurality of symbols.

Clause 82. The non-transitory computer-readable medium of any of clauses 79 to 81, wherein the pi/N-based modulation scheme is a pi/N-based phase-shift keying (PSK) modulation scheme.

Clause 83. The non-transitory computer-readable medium of clause 82, wherein: N is 8, M is 8, and the pi/N-based PSK modulation scheme comprises a pi/8 octal PSK (PI/8PSK8) modulation scheme.

Clause 84. The non-transitory computer-readable medium of clause 83, wherein the first set of constellation points comprises constellation points of an octal PSK (PSK8) modulation scheme.

Clause 85. The non-transitory computer-readable medium of clause 79, wherein the pi/N-based modulation scheme is a pi/N-based quadrature amplitude modulation (QAM) modulation scheme.

Clause 86. The non-transitory computer-readable medium of clause 85, wherein: N is 4, M is 16, and the pi/N-based QAM modulation scheme comprises a pi/4 16QAM (PI/4QAM16) modulation scheme.

Clause 87. The non-transitory computer-readable medium of clause 86, wherein the first set of constellation points comprises constellation points of a 16QAM modulation scheme.

Clause 88. The non-transitory computer-readable medium of any of clauses 79 to 87, wherein the first set of symbols and the second set of symbols are received using raised root cosine (RRC) roll-off factors between 70% and 80%.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an field-programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a wireless communications device, comprising:
   transmitting a first set of symbols of a plurality of symbols of a data stream, wherein the first set of symbols is modulated using a first set of constellation points of a pi/N-based modulation scheme; and
   transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols being transmitted on the first set of constellation points and the second set of constellation points, respectively, produces a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

2. The method of claim 1, wherein the pi/N-based modulation scheme is a pi/N-based phase-shift keying (PSK) modulation scheme.

3. The method of claim 2, wherein:
   N is 8,
   M is 8, and
   the pi/N-based PSK modulation scheme comprises a pi/8 octal PSK (PI/8PSK8) modulation scheme.

4. The method of claim 3, wherein the first set of constellation points comprises constellation points of an octal PSK (PSK8) modulation scheme.

5. The method of claim 1, wherein the pi/N-based modulation scheme is a pi/N-based quadrature amplitude modulation (QAM) modulation scheme.

6. The method of claim 5, wherein:
   N is 4,
   M is 16, and
   the pi/N-based QAM modulation scheme comprises a pi/4 16QAM (PI/4QAM16) modulation scheme.

7. The method of claim 6, wherein the first set of constellation points comprises constellation points of a 16QAM modulation scheme.

8. The method of claim 1, wherein the first set of symbols and the second set of symbols are transmitted by a power amplifier of the wireless communications device.

9. The method of claim 1, wherein the first set of symbols and the second set of symbols are transmitted using raised root cosine (RRC) roll-off factors between 70% and 80%.

10. A method of wireless communication performed by a wireless communications device, comprising:
    receiving a first set of symbols of a plurality of symbols of a data stream, wherein the first set of symbols is modulated using a first set of constellation points of a pi/N-based modulation scheme; and
    receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols are transmitted on the first set of constellation points and the second set of constellation points, respectively, such that there is a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

11. The method of claim 10, wherein the pi/N-based modulation scheme is a pi/N-based phase-shift keying (PSK) modulation scheme.

12. The method of claim 11, wherein:
    N is 8,
    M is 8, and
    the pi/N-based PSK modulation scheme comprises a pi/8 octal PSK (PI/8PSK8) modulation scheme.

13. The method of claim 12, wherein the first set of constellation points comprises constellation points of an octal PSK (PSK8) modulation scheme.

14. The method of claim 10, wherein the pi/N-based modulation scheme is a pi/N-based quadrature amplitude modulation (QAM) modulation scheme.

15. The method of claim 14, wherein:
    N is 4,
    M is 16, and
    the pi/N-based QAM modulation scheme comprises a pi/4 16QAM (PI/4QAM16) modulation scheme.

16. The method of claim 15, wherein the first set of constellation points comprises constellation points of a 16QAM modulation scheme.

17. The method of claim 10, wherein the first set of symbols and the second set of symbols are received using raised root cosine (RRC) roll-off factors between 70% and 80%.

18. A wireless communications device, comprising:
a memory;
at least one transceiver; and
at least one processor communicatively coupled to the memory and the at least one transceiver, the at least one processor configured to:
transmit, via the at least one transceiver, a first set of symbols of a plurality of symbols of a data stream, wherein the first set of symbols is modulated using a first set of constellation points of a pi/N-based modulation scheme; and
transmit, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols being transmitted on the first set of constellation points and the second set of constellation points, respectively, produces a zero-crossing avoidance area at a center of the first set of constellation points and the second set of constellation points, wherein N>4, wherein M>=8, and wherein the first set of symbols consists of M odd-numbered symbols of the plurality of symbols and the second set of symbols consists of M even-numbered symbols of the plurality of symbols.

19. The wireless communications device of claim 18, wherein the pi/N-based modulation scheme is a pi/N-based phase-shift keying (PSK) modulation scheme.

20. The wireless communications device of claim 19, wherein:
N is 8,
M is 8, and
the pi/N-based PSK modulation scheme comprises a pi/8 octal PSK (PI/8PSK8) modulation scheme.

21. The wireless communications device of claim 20, wherein the first set of constellation points comprises constellation points of an octal PSK (PSK8) modulation scheme.

22. The wireless communications device of claim 18, wherein the pi/N-based modulation scheme is a pi/N-based quadrature amplitude modulation (QAM) modulation scheme.

23. The wireless communications device of claim 22, wherein:
N is 4,
M is 16, and
the pi/N-based QAM modulation scheme comprises a pi/4 16QAM (PI/4QAM16) modulation scheme.

24. The wireless communications device of claim 23, wherein the first set of constellation points comprises constellation points of a 16QAM modulation scheme.

25. The wireless communications device of claim 18, wherein the first set of symbols and the second set of symbols are transmitted by a power amplifier of the wireless communications device.

26. The wireless communications device of claim 18, wherein the first set of symbols and the second set of symbols are transmitted using raised root cosine (RRC) roll-off factors between 70% and 80%.

27. A wireless communications device, comprising:
a memory;
at least one transceiver; and
at least one processor communicatively coupled to the memory and the at least one transceiver, the at least one processor configured to:
receive, via the at least one transceiver, a first set of symbols of a plurality of symbols of a data stream, wherein the first set of symbols is modulated using a first set of constellation points of a pi/N-based modulation scheme; and
receive, via the at least one transceiver, a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols are transmitted on the first set of constellation points and the second set of constellation points, respectively, such that there is a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

28. The wireless communications device of claim 27, wherein the pi/N-based modulation scheme is a pi/N-based phase-shift keying (PSK) modulation scheme.

29. The wireless communications device of claim 28, wherein:
N is 8,
M is 8, and
the pi/N-based PSK modulation scheme comprises a pi/8 octal PSK (PI/8PSK8) modulation scheme.

30. The wireless communications device of claim 29, wherein the first set of constellation points comprises constellation points of an octal PSK (PSK8) modulation scheme.

31. The wireless communications device of claim 27, wherein the pi/N-based modulation scheme is a pi/N-based quadrature amplitude modulation (QAM) modulation scheme.

32. The wireless communications device of claim 31, wherein:
N is 4,
M is 16, and
the pi/N-based QAM modulation scheme comprises a pi/4 16QAM (PI/4QAM16) modulation scheme.

33. The wireless communications device of claim 32, wherein the first set of constellation points comprises constellation points of a 16QAM modulation scheme.

34. The wireless communications device of claim 27, wherein the first set of symbols and the second set of symbols are received using raised root cosine (RRC) roll-off factors between 70% and 80%.

35. A wireless communications device, comprising:
means for transmitting a first set of symbols of a plurality of symbols of a data stream, wherein the first set of symbols is modulated using a first set of constellation points of a pi/N-based modulation scheme; and
means for transmitting a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols being transmitted on the first set of constellation points and the second set of constellation points, respectively, produces a zero-crossing avoidance area at a center of the first set of constellation points and the second set of constellation points, wherein N>4, wherein M>=8, and wherein the first set of symbols consists of M odd-numbered symbols of the plurality of symbols and the second set of symbols consists of M even-numbered symbols of the plurality of symbols.

36. A wireless communications device, comprising:
means for receiving a first set of symbols of a plurality of symbols of a data stream, wherein the first set of symbols is modulated using a first set of constellation points of a pi/N-based modulation scheme; and
means for receiving a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols are transmitted on the first set of constellation points and the second set of constellation points, respectively, such that there is a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

37. A non-transitory computer-readable medium storing computer-executable instructions that, when executed by a wireless communications device, cause the wireless communications device to:
transmit a first set of symbols of a plurality of symbols of a data stream, wherein the first set of symbols is modulated using a first set of constellation points of a pi/N-based modulation scheme; and
transmit a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols being transmitted on the first set of constellation points and the second set of constellation points, respectively, produces a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

38. A non-transitory computer-readable medium storing computer-executable instructions that, when executed by a wireless communications device, cause the wireless communications device to:
receive a first set of symbols of a plurality of symbols of a data stream, wherein the first set of symbols is modulated using a first set of constellation points of a pi/N-based modulation scheme; and
receive a second set of symbols of the plurality of symbols, wherein the second set of symbols is modulated using a second set of constellation points of the pi/N-based modulation scheme, wherein each of the first set of constellation points and the second set of constellation points consists of M constellation points, wherein the second set of constellation points is rotated from the first set of constellation points by pi/N, wherein symbols of the first set of symbols alternate with symbols of the second set of symbols, wherein the first set of symbols and the second set of symbols are transmitted on the first set of constellation points and the second set of constellation points, respectively, such that there is a zero-crossing avoidance area at a center of the first set of constellation points and the second set of constellation points, wherein N>=4, wherein M>=8, and wherein the first set of symbols consists of M odd-numbered symbols of the plurality of symbols and the second set of symbols consists of M even-numbered symbols of the plurality of symbols.

* * * * *